(12) United States Patent
Focke et al.

(10) Patent No.: US 6,550,220 B1
(45) Date of Patent: Apr. 22, 2003

(54) METHOD AND DEVICE FOR DIAGNOSING MACHINES

(75) Inventors: Heinz Focke, Verden (DE); Thomas Häfker, Langwedel (DE); Hartmut Olbrich, Verden (DE)

(73) Assignee: Focke & Co. (GmbH & Co.) (DE)

( * ) Notice: Subject to any disclaimer, the term of this patent is extended or adjusted under 35 U.S.C. 154(b) by 119 days.

(21) Appl. No.: 09/672,174

(22) Filed: Sep. 27, 2000

(30) Foreign Application Priority Data

Sep. 29, 1999 (DE) .......................... 199 46 787

(51) Int. Cl.⁷ .................................. B65B 1/30
(52) U.S. Cl. ............................. 53/396; 53/499
(58) Field of Search ....................... 53/396, 52, 53, 53/54, 55, 498, 499

(56) References Cited

U.S. PATENT DOCUMENTS

| | | | | |
|---|---|---|---|---|
| 4,441,302 A | * | 4/1984 | Gabbitas et al. | 53/52 |
| 4,505,091 A | * | 3/1985 | Hinchcliffe et al. | 53/444 |
| 4,691,496 A | * | 9/1987 | Anderson et al. | 141/144 |
| 5,314,566 A | * | 5/1994 | Gallagher et al. | 156/350 |
| 5,784,855 A | * | 7/1998 | Focke et al. | 53/234 |
| 5,970,682 A | * | 10/1999 | Focke et al. | 493/12 |

FOREIGN PATENT DOCUMENTS

DE    2842 461 A1    4/1980

* cited by examiner

*Primary Examiner*—Stephen F. Gerrity
*Assistant Examiner*—John Paradiso
(74) *Attorney, Agent, or Firm*—Todd Deveau; Troutman Sanders LLP (57) ABSTRACT

The invention relates to a method and a device for diagnosing machines (10) for manufacturing products such as cigarettes (12) or cigarette packets (11), the products being examined for faults, and a signal indicating a faulty product being generated. The invention is based on the problem of improving the diagnosis. In order to solve this problem, the method according to the invention is characterized in that the fault-indicating signal (46) is evaluated for possible periodicity of faulty products (11, 12), and a possible periodicity is determined. For this purpose, the device according to the invention has an appropriately constructed control device (27*a*).

19 Claims, 4 Drawing Sheets

METHOD AND DEVICE FOR DIAGNOSING MACHINES

This is a priority application based upon German patent application 199 46 787.0, filed Sep. 29, 1999.

FIELD OF THE INVENTION

The invention relates to a method and a device for diagnosing machines for manufacturing products such as cigarettes and/or cigarette packets, in particular cigarette-packaging machines. In the case of such a method, the products are examined for faults and a signal indicating a faulty product is generated. Such a device correspondingly has fault-detecting means for investigating whether a product is faulty, and for generating a signal indicating a, faulty product.

BACKGROUND OF THE INVENTION

Machines of the above type are generally of very complex design. A multiplicity of various subassemblies and tools cooperate in order to manufacture cigarettes and/or finished cigarette packets or other products, including packaging them. Disturbances which impair the product to be manufactured can arise in the case of each individual subassembly or tool. In order to ensure unchanged product quality, the products are examined at the end or during the course of processing with regard to possible faults. If a fault is detected, this is indicated by a corresponding signal, and the product is removed from the course of processing.

It is customary to use a range of sensors on different subassemblies or tools in order to locate the faulty subassemblies or tools causing the faulty products. However, it is not possible in practice to monitor every subassembly or every tool. Consequently, the diagnosis of machines after the occurrence of a fault is frequently very difficult and it is necessary to. dismantle and examine a multiplicity of subassemblies and tools. This leads to high costs and is therefore disadvantageous.

SUMMARY OF THE INVENTION

The invention is therefore based on the problem of improving the diagnosis of machines.

For the purpose of solving this problem, the method according to the invention is characterized in that the fault-indicating signal is evaluated for possible periodicity, in particular one or more periods, of faulty products, and a possible periodicity is determined. A device according to the invention is characterized by a control device which is constructed in such a way that it is possible to determine and specify a periodicity of the fault-indicating signal.

The terms below are used as follows in conjunction with the invention and preferred embodiments of the invention. The term "products" is understood as all end, intermediate and initial products during a manufacturing process, including a packaging process, in particular finished and unfinished cigarette packets or cigarettes in the region of the cigarette manufacturing and/or packaging.The term "periodicity" is to be understood as any periodic characteristic of the fault-indicating signal. The fault-indicating signal can, in particular, exhibit one or more periods. The term "cycle" is to be understood as any regular movement, in particular movement with a temporary standstill, but also continuous movements. The term "subassembly" is understood as any unit of tools, in particular so-called turrets such as folding, transfer or drying turrets, pocket chains or else magazines and shaft groups. The term "tools" is to be understood as individual elements of a subassembly, for example individual pockets of a pocket chain or of a turret, and shafts of shaft groups.

The invention is based on the finding that in machines of the above-named type many subassemblies operate cyclically and, for this purpose, have a specific number of tools. If an individual tool of a subassembly operates defectively, individual manufactured products are faulty, at least with an increased probability, specifically with a period which corresponds to the number of tools of this subassembly. Since the individual subassemblies of a machine generally have a characteristic number of tools, the faulty products occur with a period corresponding to this number. Consequently, a faulty subassembly or a subassembly having the faulty tool can be detected with the aid of its characteristic period.

Faulty products can, however, also occur with several different periods. This is the case. when a machine fault impairs several subassemblies with different periods, something which can, in particular, be associated with a fault in a transition region of two subassemblies.

If, for example, a subassembly 24 has tools of which one is faulty, and in which case the subassembly advances by one tool with each machine cycle, the result is a fault period of 24 machine cycles in the examined products. In the case of other subassemblies, however, a plurality of tools can be advanced per machine cycle. It is likewise possible for a tool to be advanced one position only after several machine cycles. In each case, however, the result in the case of such cyclically operating subassemblies is one or more characteristic periods, and it is therefore possible to conclude that there are one or more faulty subassemblies given the occurrence of a corresponding periodicity in the fault-indicating signal. Furthermore, it is also possible to locate the respective tool when the spacing, in particular in machine cycles, between the fault-detecting means and a reference position, for example the uppermost tool, is known.

If it is not possible upon the occurrence of faulty products to determine a specific periodicity, and/or the fault occurs with the same probability for each product or machine cycle, the invention assumes that all tools. are uniformly affected by a fault.

BRIEF DESCRIPTION OF THE DRAWINGS

Further details of the invention follow from the subclaims and with the aid of an exemplary embodiment illustrated in the drawings. In the drawings

DETAILED DESCRIPTION OF THE DRAWINGS

Figure 1:
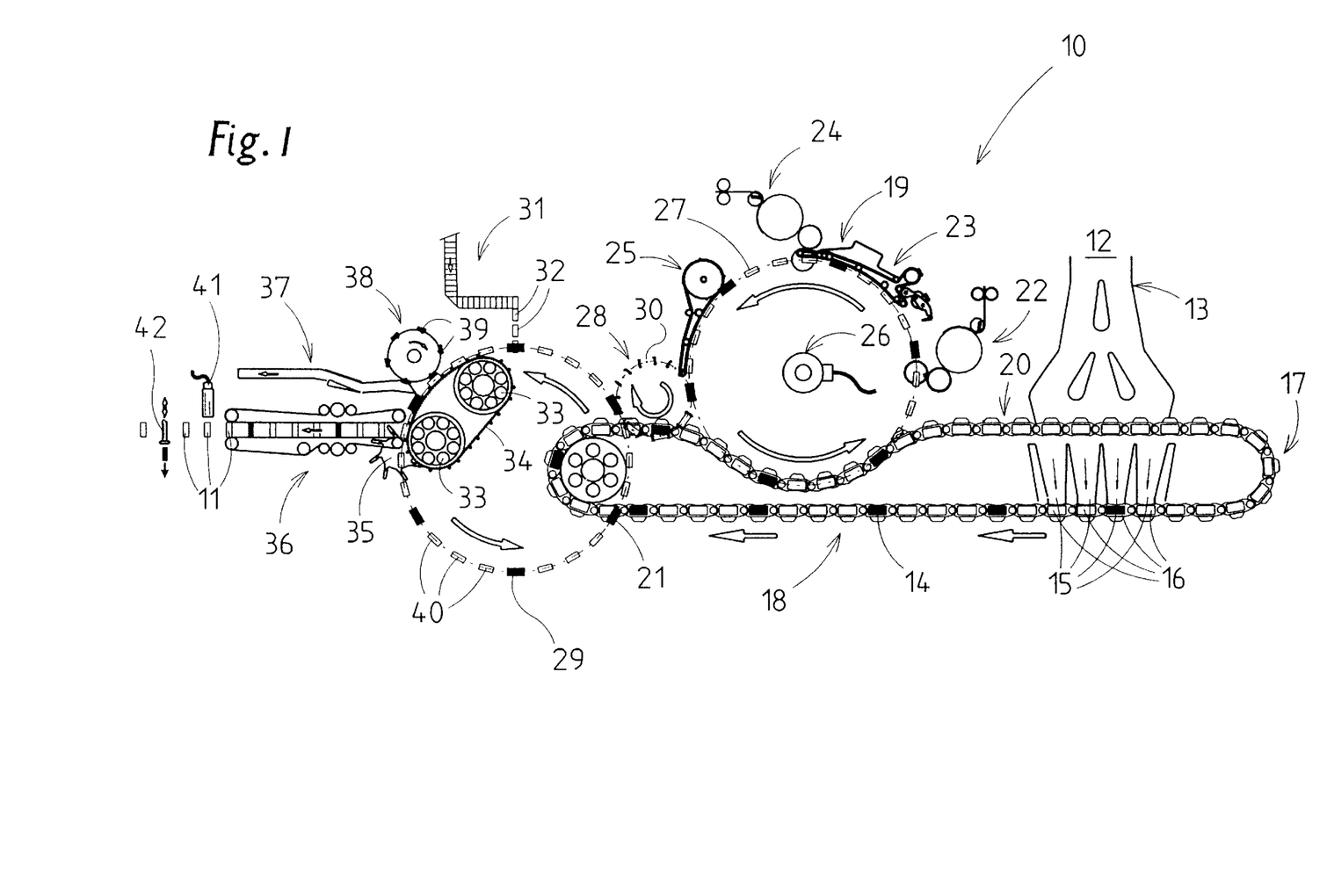
FIG. 1 shows details of a packaging machine for cigarettes, in a simplified side view.

FIG. 1 shows a machine 10 for manufacturing cigarette packets 11 of the type of a soft-carton pack. Cigarettes 11 are transferred to the machine in the region of a cigarette magazine 13. It serves to store cigarettes 12 and to dispense cigarette groups 14 in accordance with the content of a cigarette packet 11. For this purpose, the cigarette magazine 13 has magazine shafts in the lower region which are combined into shaft groups 15. A cigarette group 14 is pushed from each shaft group 15 into pockets 16 of a pocket chain 17, specifically in the region of a lower conveyor strand 18. The pocket chain 17 transports the cigarette group 14 to a folding turret 19 to which they are transferred by being pushed out of the pockets 16 of the pocket chain 17 in the region of an upper conveyor strand 20.

The cigarette magazine 13 has four shaft groups 15. Consequently, every fourth cigarette group 14 located in the pocket chain 17 passes from the same shaft group 15 into the pocket chain 17. If, for example, a shaft group 15 should not operate properly, because, for example, a transverse cigarette 12 is blocking one or more shafts of the shaft group 15, every fourth cigarette group in the pocket chain 17 would be defectively formed. Such a fault would therefore be repeated in the production process with a period of four products or cigarette packets 11.

The pocket chain 17 has, for example, 72 tools, specifically pockets 16, of which, however, only a small number are illustrated in FIG. 1. If, for example, one of the pockets 16 of the pocket chain 17 is faulty, for example worn out, faulty products are produced with a period of 72. However, there is at least an increase in the probability that a product—a cigarette packet 11—with this period is faulty in construction.

The pocket chain 17 operates with two different cycles. Firstly, the pocket chain 17 is pushed ahead in the region of the upper conveyor strand 20 in a cycle corresponding to the machine cycle, in particular continuously. In this case, the pocket chain 17 is displaced by one pocket 16 with each machine cycle. In the region of the lower conveyor strand 18, by contrast, the pocket chain 17 is moved forward in a slower cycle, in particular with a temporary standstill. This cycle is reduced by the factor 4, which corresponds to the number of shaft groups 15. Four cigarette groups 14 are simultaneously pushed into four pockets 16 of the lower conveyor strand 18 per cycle of this slower cycle. This is achieved by virtue of the fact that two deflecting rollers 21, which guide the pocket chain (and of which only the left-hand one is illustrated) are displaced horizontally, specifically with a basic cycle which corresponds to this slower cycle.

Depending on the type of a faulty tool or machine element—this particular cycle pattern of the pocket chain 17 can lead to a specific periodicity of faulty packets 11, with the result that a fault in this mechanism can also lead to several different periods in the signal indicating faulty packets. This holds, in particular, when the number of pockets 16 is not a multiple of the shaft groups 15. The more periods contained in the fault-indicating signal, the more comprehensive the information on a faulty subassembly or a faulty tool.

The folding turret 19 is provided along its circumference with a multiplicity of members for holding blanks made from paper or tin foil for the inner cover and outer cover of a packet 11 or for a carton. Illustrated by way of example are members 22 for feeding internal blanks, a folding unit 23, a feed member 24 for the external blank, from which the pack carton is formed, and further folding units 25 for closing the pack carton. A rotary transmitter 26 arranged at the centre of the folding turret 19 serves to determine the position of the folding turret 19 or of a single, several or all holding members 27 for holding a cigarette group 14 during the folding operation. The rotary transmitter is connected to a control unit 27a illustrated in FIG. 2. The folding turret 19 has, for example, 24 tools, specifically holding members 27.

The number of tools, specifically pockets 16, of the pocket chain 17 is therefore an integral multiple of the number of the tools, specifically holding members 27, of the folding turret 19.

After the cigarette groups 14 have traversed the folding turret 19, they are transferred to a drying turret 29 by means of a transfer turret 28. The transfer turret 28 has eight tools, specifically holding members 30, for holding largely finished cigarette packets 11. Again, the number of the tools of the transfer turret 28 is selected in such a way that an integral multiple thereof corresponds to the number of the tools of the folding turret 19.

In the drying turret 29, the cigarette packets are dried in several planes—situated one behind another in the plane of the drawing—and are provided with revenue stamps 32 by means of a revenue-stamp apparatus 31. The finished packets 11 pass via a star wheel 35 to a removal means 36 by means of a belt conveyor 34 guided via two deflecting rollers 33. Faulty packets can be taken out by means of a take-out unit 37. This take-out unit has a take-out wheel 38 with six tools, specifically grippers 39. By contrast, the drying turret 29 has 24 tools, specifically holding members 40. The number of the tools of the drying turret is therefore, once again, an integral multiple of the tools of the transfer turret 28 and of the take-out wheel 38. The finished packets are examined for possible faults in the end region of the removal means 36 with the aid of fault-detecting means. A monitoring camera 41, which is connected to the control unit 27a, serves this purpose.

Instead of, or in addition to, the monitoring camera 41, however, it is also possible to use any other type of optical, mechanical, electrical and/or magnetic resonance sensors. Depending on the type of product to be manufactured, consideration is also given to acoustic sensors, such as ultrasonic sensors. If the monitoring camera 41 or, as the case may be, another sensor determines a faulty product—a packet 11—this product is ejected by means of an ejector 42, and thereby removed from the manufacturing process. However, it is also possible for the monitoring camera 41 to permit an evaluation of a faulty packet, such that in the case of only slight faults the packet remains in the manufacturing process, and only a signal indicating a fault is generated.

The complexity of modern machines for manufacturing products, in particular packs, is clearly to be seen from the illustrated packaging machine for cigarettes. In this case, each subassembly (magazine 13, pocket chain 17, folding turret 19, transfer turret 28, drying turret 29, take-out unit 37) has a multiplicity of tools which can wear because of mechanical loads. Possible faults can firstly be detected only in terms of type by means of the monitoring camera 41. However, the invention also permits the subassembly and the corresponding tool to be located. Here, the respective number of tools within a subassembly play a role in particular. In the case of the described subassemblies, the number of the tools of a subassembly is in each case an integral multiple of the tools of another subassembly. As a result of this, possible fault periods are also in each case integral multiples of a small or the smallest period. However, the invention can also be used for machines in the case of which the number of the tools of the individual subassemblies exhibit between themselves not integral multiples, but non-integral ones. Given such a selection of the number of the tools, the fault-indicating signal can have a periodicity consisting of several periods.

Figure 2:
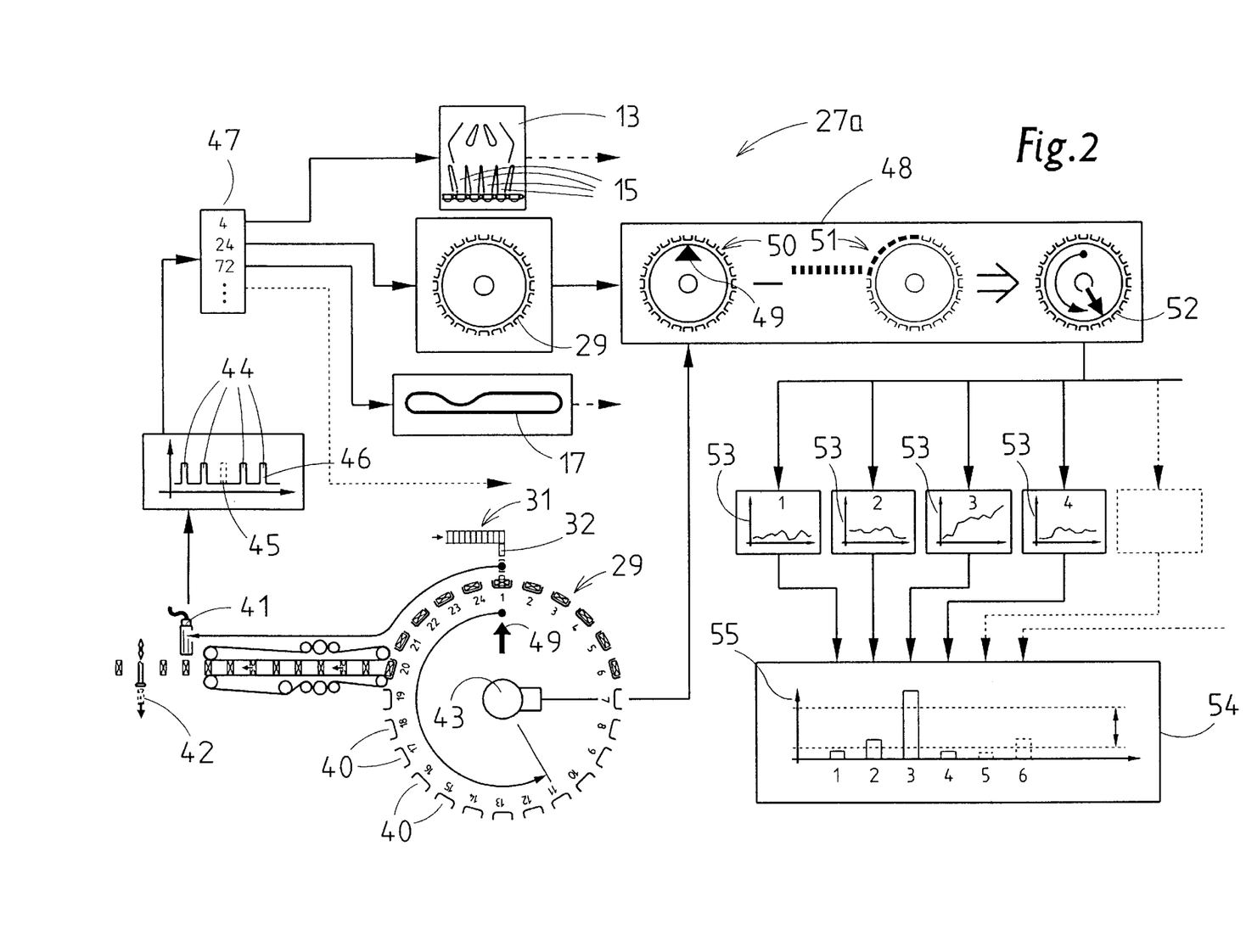
FIG. 2 shows a detail of the packaging machine from FIG. 1 in the region of the drying turret, and a block diagram for illustrating a processing of a fault-indicating signal.

FIG. 2 shows a detail of the machine from FIG. 1, in the region of the drying turret 29. The drying turret 29 also has a rotary transmitter 43, as, furthermore, all subassemblies of the machines have a position transmitter. The rotary transmitter 43 is connected to the control unit 27a, as are the other position transmitters.

The monitoring camera 41 generates a rectangular signal 44 or a signal at a high level for each non-faulty product, specifically packet 11. If a packet 11 is missing or is faulty, the monitoring camera 41 does not generate such a rectangular signal 44, but an interference signal at a low level, which indicates the missing or faulty packet 11.

The control unit 27a examines the so-called fault-indicating signal 46, which is formed from rectangular signals and interference signals. It establishes in this case whether a specific periodicity obtains within the fault-indicating signal, in particular the interference signals, that is to say whether the interference signals occur with a specific rhythm. This examination for a possible periodicity is performed in the periodicity block 47. The periodicity block 47 decides whether the fault-indicating signal has a period of 4, 24, 72 and/or if appropriate, a further period, corresponding to a number of tools within a subassembly.

Since the numbers of tools of different subassemblies are advantageously different, the periodicity determined can be used to assign a fault to a subassembly, specifically to the shaft groups 15 of the magazine 13, to the folding and/or drying turret 29 or to the pocket chain 17. In the example according to FIG. 2, a fault was assigned to the drying turret 29.

Subsequently, the calculation of the faulty tool is carried out in a calculating block 48. In this case, a position 50 of the rotary transmitter 43, and a previously specified offset 51 between a reference position 49 of the rotary transmitter 43 and the monitoring camera 41 are interrogated. This offset amounts to 14 cycles in the example according to FIG. 2. The faulty tool—holding member 40—can now be determined from a difference of the position 50 determined by the position transmitter 43, and the offset 51. It follows from this in the example according to FIG. 2 that the product instantaneously monitored by the camera 41 was processed with the aid of the holding member 40 with the identification number 11. The calculating block 48 therefore provides information on that tool within a subassembly which is decisive for the current product under examination.

The position 50 determined by the rotary transmitter 43 is represented in the left-hand region in the calculating block 48. The offset 51 between the monitoring camera 41 and reference position 49 is subtracted therefrom. The result is the tool position 52 of the tool responsible for the instantaneously examined packet.

A fault curve 53 is drawn for each tool. The fault curves 53 for the first four tools of the drying turret 29 are illustrated in FIG. 2. At each instant, each fault curve 53 represents a mean value or the sum of faults in the last M cycles. The number M of the elapsed cycles is a function of the machine 10 and the subassembly examined. The number M is, however, preferably a multiple of the number of tools within a subassembly.

Determined in the histogram block 54 is a histogram 55 in the case of which the instantaneous fault frequency within the last M cycles is specified for each tool within a subassembly. This fault frequency is specified as a relative or absolute fault frequency.

Figure 3:
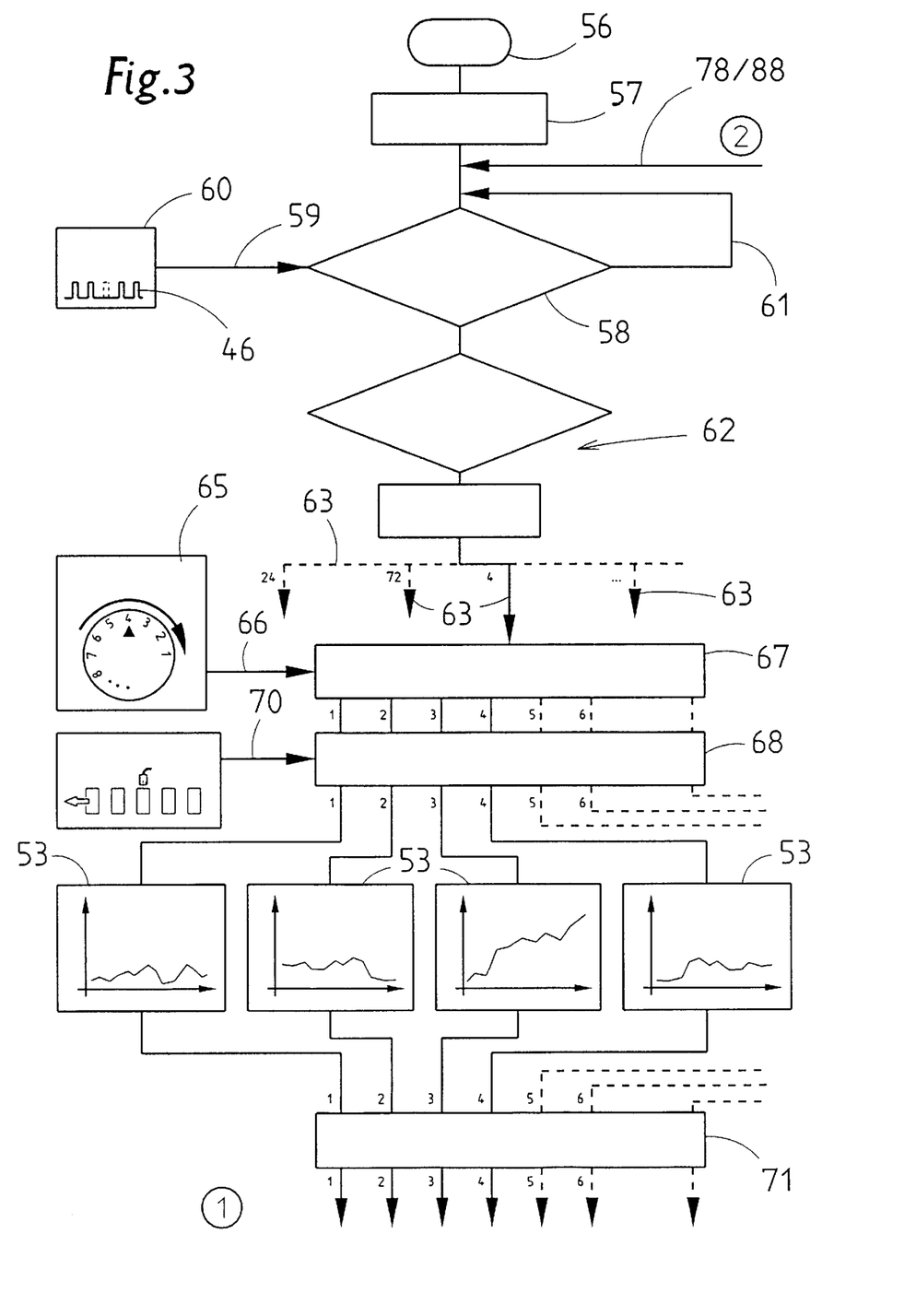
FIG. 3 shows a first part of a flowchart for illustrating a refinement of the method according to the invention.
Figure 4:
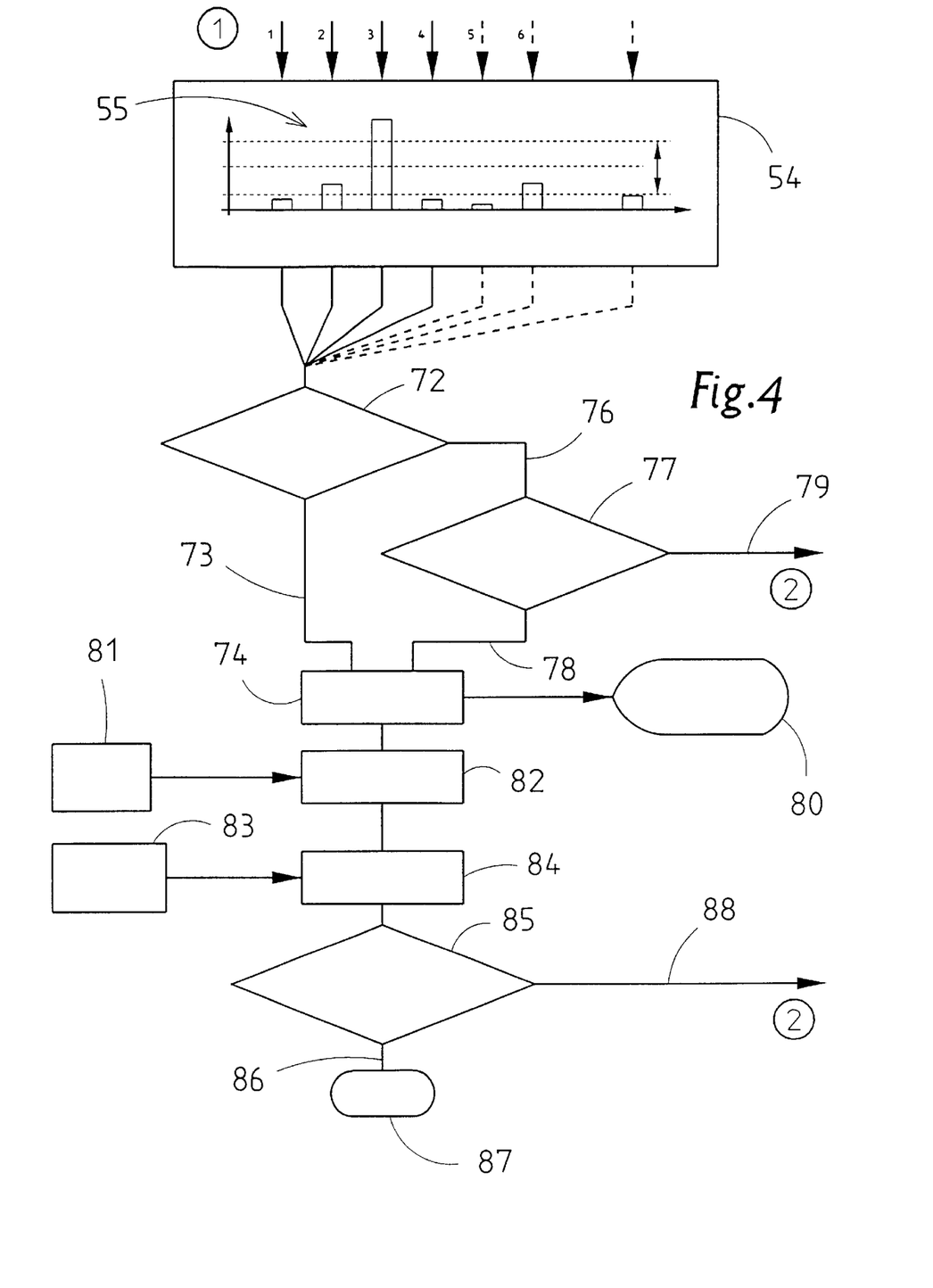
FIG. 4 shows a second part of the flowchart relating to FIG. 3.

The histogram 55 then serves the purpose of more closely examining the individual subassemblies, and of displaying faulty subassemblies, as is explained in more detail with the aid of the flowchart illustrated in FIGS. 3 and 4.

FIG. 3 shows a first part of this flowchart. The diagnosis method starts with the starting block 56. It starts the production with the start production block 57. A branching block 58 interrogates the fault-indicating signal 46, which indicates whether a packet is in order (IO) or not in order (NIO). For this purpose, the branching block 58 receives an item of input information 59 from an interrogation block 60 which carries out the evaluation of the fault-indicating signal 46 in terms of a satisfactory or unsatisfactory packet.

The branching block 58 also determines whether a fault occurs in a periodic sequence. Various methods can be used for this purpose. Particular consideration is given to a Fourier analysis of the fault-indicating signal 46, which provides information on preferred frequencies of faults which occur. However, an autocorrelation of the error indicating signal 46 is also possible. In principle, all methods are suitable which provide information on the periodicity of a signal.

If a fault in the fault-indicating signal 46 does not appear in a periodic sequence, the method sequence jumps back to the input of the branching block 58 via the branch 61. However, if the fault does appear in a periodic sequence, the branching block 58 directs the method sequence to a selection block 62 which determines the period with which the fault repeats, and selects or determines a subassembly corresponding to this period. Provided for this purpose are forks 63 which continue the method with different parameters, in each case. A subassembly with the period 4 is selected in the example according to FIG. 3.

In a tool-positioning block 65, a position transmitter 64 of the selected subassembly interrogates the tool position of the tools of the subassembly. It is fed to a calculating block 67 as input information 66. The calculating block 67 subsequently calculates the tool number, which serves to identify a tool, from the sum of the tool position and the offset, which corresponds to the spacing between the monitoring camera and the reference position of the position transmitter 64.

Fault curves are drawn for the individual tools in a further calculating block 68. In this case, the production batch-quantity n is also interrogated in the interrogation block 70 as input information 69 for the tool block 68. The result is a number of fault curves 53 which corresponds to the number of tools N, as already explained in conjunction with FIG. 2, that is to say for a specific production batch-quantity n, each fault curve 53 indicates a fault frequency over the elapsed M cycles. A calculating block 71 uses the fault curves 53 to draw a histogram 55, specifically in the histogram block 54, which is illustrated in FIG. 4. The interface between the associated FIGS. 3 and 4 is marked by an encircled 1. The (relative) fault frequencies in the N tools are indicated by $P_1, P_2, P_3, P_4, P_5, P_6, \ldots, P_N$ in the histogram 55 in FIG. 4. For large production batch-quantities, the relative fault frequency tends to the fault probability of the respective tool.

Also specified in the histogram 55 is the mean fault frequency $\overline{P}$ of all tools of the selected subassembly, which likewise tends for production-batch quantities to the mean fault probability of all tools of a subassembly. A limiting value $L_1$ for the maximum fault frequency or fault probability permissible in the subassembly is also represented. This limiting value is specific to the subassembly, that is to say different for each subassembly. Also illustrated is a maximum permissible differential value $L_2$ which—added to the mean fault frequency or fault probability $\overline{P}$ specifies an upper limiting value for the fault frequency or fault probability of a tool. The mean fault frequency $\overline{P}$ of all tools of a subassembly varies continuously, since a mean value over these tools is calculated in each case over M elapsed cycles.

A further branching block 72 interrogates whether the maximum fault frequency $L_1$ permissible in a subassembly is larger than the mean fault frequency $\overline{P}$ of all tools of the subassembly. If this question is to be answered with "NO", the sequence branches via the branch 73 to a machine stop block 74 which generates a machine stop signal.

The branch 73 indicates a fault in a subassembly preceding the subassembly examined, since no specific tool of the examined subassembly has a significant increase in fault frequency. Rather, when the branch 73 is reached, several or all tools of the examined subassembly are equally affected by an increase in the fault frequency P1–PN. It may be deduced from this that the fault is caused not in the currently examined subassembly, but in a preceding subassembly in the production process.

If the question of the branching block 72 is to be answered with "YES", the method sequence is directed via a branch 76 to the further branching block 77. The branching block 77 poses the question as to whether the maximum permissible differential value $L_2$ is greater than the difference between the fault frequency in a tool PX and the mean fault frequency of all tools of a subassembly $\overline{P}$. If this question is to be answered with "NO", the method sequence likewise passes via the branch 78 to the machine stop block 74, so that a machine stop signal is generated. The branch 78 indicates a fault in a specific tool X of the examined subassembly. Specifically, when the branch 78 is reached, the fault frequency of the tool X is greater than the sum of the mean fault frequency $\overline{P}$ and the maximum permissible differential value $L_2$.

If the question in branching block 77 is to be answered with "YES", the method jumps back via the branch 79 to the branching block 58, as illustrated in FIG. 3.

After the machine stop signal has been generated in the machine stop block 74, an output in the output block 80 informs an operator of the fault source, in particular tool number and subassembly. An interrogation block 81 waits for an operator input in reaction to the output of the output block 80, in order to start a search run. This search run is carried out by the machine search run block 82. The machine is thereby brought into a position such that the faulty tool is located in a maintenance position and is therefore freely accessible for maintenance and/or repair measures.

An operator input which indicates an accomplished fault removal is interrogated via a further interrogation block 83. Thereupon, a mark set by the machine stop signal is reset in the fault-removal block 84, and thus the fault indicated is removed again. The question of whether the production aim has been reached is posed in a branching block 85 following the fault-removal block 84. If this question is to be answered with "YES", the method is terminated and is transferred to a final state via the branch 86 with the end block 87. If the question is to be answered with "NO", the method sequence passes back via the branch 88 to the branching block 88, which is illustrated in FIG. 3, and is continued there.

The control unit 27a shown in FIG. 2 serves, in particular, to implement the blocks and functions illustrated and explained in FIGS. 2–4, and provides appropriate means for realizing the functions, in particular a microprocessor and a memory.

It is true that the invention can advantageously be applied to cigarette packaging machines, and is therefore described in the exemplary embodiment in conjunction with a packaging machine. However, it can be used in the case of other machines which manufacture products of the most varied type and also package them in the process, if appropriate. The finding on which the invention is based, that specific faults on tools and subassemblies cause specific periodicities in the faults of the products manufactured, can, namely, be applied in essentially all machines for manufacturing products. Thanks to the invention, it is possible to diagnose and locate an individual faulty subassembly and/or an individual tool within a subassembly with a high degree of reliability without a multiplicity of sensors on each individual tool, but with only one or a few fault detecting means such as monitoring cameras.

Applicant: Aug. 28, 2000/5915
Focke & Co. (GmbH & Co.) FOC-634
Siemensstrasse 10
27283 Verden List of designations

| | |
|---|---|
| 10 | Machine |
| 11 | Cigarette packet |
| 12 | Cigarette |
| 13 | Cigarette magazine |
| 14 | Cigarette group |
| 15 | Shaft group |
| 16 | Pockets |
| 17 | Pocket chain |
| 18 | Lower conveyor strand |
| 19 | Folding turret |
| 20 | Upper conveyor strand |
| 21 | Deflecting roller |
| 22 | Feed member |
| 23 | Folding unit |
| 24 | Feed member |
| 25 | Folding unit |
| 26 | Rotary transmitter |
| 27 | Holding member |
| 27a | Control unit |
| 28 | Transfer turret |
| 29 | Drying turret |
| 30 | Holding member |
| 31 | Revenue-stamp apparatus |
| 32 | Revenue stamp |
| 33 | Deflecting roller |
| 34 | Belt conveyor |
| 35 | Star wheel |
| 36 | Removal means |
| 37 | Take-out unit |
| 38 | Take-out wheel |
| 39 | Gripper |
| 40 | Holding member |
| 41 | Monitoring camera |
| 42 | Ejector |
| 43 | Rotary transmitter |
| 44 | Rectangular signal |
| 45 | Interference signal |
| 46 | Fault-indicating signal |
| 47 | Periodicity block |
| 48 | Calculating block |
| 49 | Reference position |
| 50 | Rotary transmitter position |
| 51 | Offset |
| 52 | Tool position |
| 53 | Fault curve |
| 54 | Histogram block |
| 55 | Histogram |
| 56 | Starting block |
| 57 | Start/production block |
| 58 | Branching block |
| 59 | Input information |
| 60 | Interrogation block |
| 61 | Branch |
| 62 | Selection block |
| 63 | Fork |
| 64 | Position transmitter |

-continued

| | |
|---|---|
| Applicant: | Aug. 28, 2000/5915 |
| Focke & Co. (GmbH & Co.) | FOC-634 |
| Siemensstrasse 10 | |
| 27283 Verden | |

List of designations

| | |
|---|---|
| 65 | Tool-positioning block |
| 66 | Input information |
| 67 | Calculating block |
| 68 | Calculating block |
| 69 | Input information |
| 70 | Interrogation block |
| 71 | Calculating block |
| 72 | Branching block |
| 73 | Branch |
| 74 | Machine stop block |
| 75 | Branching block |
| 76 | Branch |
| 77 | Branching block |
| 78 | Branch |
| 79 | Branch |
| 80 | Output block |
| 81 | Interrogation block |
| 82 | Machine search run block |
| 83 | Interrogation block |
| 84 | Fault-removal block |
| 85 | Branching block |
| 86 | Branch |
| 87 | Output block |
| 88 | Branch |
| $P_1$, $P_2$, $P_3$, ..., $P_X$, ..., $P_N$ | Fault frequency of a tool |
| p: | Mean fault frequency of all tools |
| L1 | Maximum permissible fault frequency |
| L2 | Maximum permissible differential value |
| N | Number of tools of a subassembly |
| M | Number of cycles |
| n | Production batch-quantity |

What is claimed is:

1. Method for diagnosing machines including cigarette-packaging machines for manufacturing products including cigarettes and cigarette packets, comprising the following steps:
   providing subassemblies, the subassemblies having tools;
   examining the products for a faulty product;
   generating a fault-indicating signal indicating a faulty product;
   evaluating the fault-indicating signal for a fault-indicating signal periodicity;
   determining the fault-indicating signal periodicity;
   assigning a characteristic periodicity to each subassembly, wherein one of the subassemblies is assigned the fault-indicating signal periodicity;
   determining a fault frequency for each tool and/or subassembly; and
   generating a machine stop signal when a maximum permissible fault frequency ($L_1$) or estimated fault probability within a subassembly is not greater than a current mean fault frequency ($\overline{P}$) or fault probability of the tools of the subassembly.

2. Method according to claim 1 further comprising the steps of querying a position of a subassembly and/or of a tool within a subassembly;
   determining an offset which specifies a spacing between an examined product and the subassembly and/or tool which is causing the faulty products and;
   determining with the aid of the queried position which subassembly and/or tool is causing the faulty product.

3. Method according to claim 1 further comprising the step of drawing at least one histogram which specifies fault frequencies or estimated fault probabilities of the tools of a subassembly.

4. Method according to claim 1 further comprising the step of generating a display which informs an operator that there is a machine fault in a prior subassembly in the production process.

5. Method according to claim 1 further comprising the steps of generating a machine stop signal when a maximum permissible differential value ($L_2$) is not greater than a difference between the fault frequency or estimated fault probability of one of the tools and the mean fault frequency ($\overline{P}$) or fault probability of the tools of the subassembly belonging to this tool, and
   generating a display which informs the operator that this tool of this subassembly is faulty.

6. Method according to claim 5, wherein the display is generated when the maximum permissible fault frequency ($L_1$) or fault probability is greater than the mean fault frequency ($\overline{P}$) or fault probability of the tools of the subassembly.

7. Method according to claim 1, wherein after generation of the machine stop signal, the machines are stopped in a position such that a tool detected as faulty, or such a subassembly, is located in a maintenance position.

8. Method according to claim 1 further comprising the step of determining which subassembly is causing the faulty product.

9. Method for diagnosing machines including cigarette-packaging machines for manufacturing products including cigarettes and cigarette packets, comprising the following steps:
   providing subassemblies, the subassemblies having tools;
   examining the products for a faulty product;
   generating a fault-indicating signal indicating a faulty product;
   evaluating the fault-indicating signal for a fault-indicating signal periodicity;
   determining the fault-indicating signal periodicity;
   assigning a characteristic periodicity to each subassembly, wherein one of the subassemblies is assigned the fault-indicating signal periodicity;
   plotting a fault curve for each tool and/or subassembly; and
   generating a machine stop signal when a maximum permissible fault frequency ($L_1$) or estimated fault probability within a subassembly is not greater than a current mean fault frequency ($\overline{P}$) or fault probability of the tools of the subassembly.

10. Method according to claim 9, wherein the fault curve indicates the number of faulty products during a fixed number (M) of cycles as a function of the manufactured product.

11. Method according to claim 9 further comprising the step of generating a display which informs an operator that there is a machine fault in a prior subassembly in the production process.

12. Method according to claim 9 further comprising the step of drawing at least one histogram which specifies fault frequencies or estimated fault probabilities of the tools of a subassembly.

13. Method for diagnosing machines including cigarette-packaging machines for manufacturing products including cigarettes and cigarette packets, comprising the following steps:
   providing subassemblies, the subassemblies having tools;
   examining the products for a faulty product;
   generating a fault-indicating signal indicating a faulty product;

evaluating the fault-indicating signal for a fault-indicating signal periodicity;

determining the fault-indicating signal periodicity; and assigning a characteristic periodicity to each subassembly, wherein one of the subassemblies is assigned the fault-indicating signal periodicity;

wherein the number of tools of one of the subassemblies is an integral multiple of the number of tools of another of the subassemblies.

14. Method according to claim 13 further comprising the steps of querying a position of a subassembly and/or of a tool within a subassembly;

determining with the aid of the queried position which subassembly and/or tool is causing the faulty product; and determining an offset which specifies a spacing between an examined product and the subassembly and/or tool which is causing the faulty product.

15. Device according to claim 14 further comprising:

a selection device for selecting a subassembly with the aid of the fault-indicating signal periodicity;

a position transmitter assigned to a subassembly for determining the position of a tool within the subassembly;

tool identification means to identify a faulty tool with the aid of the determined position and an offset which specifies a spacing between the fault-detecting means and an examined product; and indicating means for indicating a faulty subassembly and/or a faulty tool.

16. Device for diagnosing machines for manufacturing products such as cigarettes and/or cigarette packets, in particular cigarette-packaging machines, comprising:

subassemblies, each subassembly having tools;

fault detection means for investigating whether a product is faulty, and for generating a fault-indicating signal indicating a faulty product;

a control unit to determine and specify a fault-indicating signal periodicity;

assigning means to assign a characteristic periodicity to each subassembly, wherein one of the subassemblies is assigned the fault-indicating signal periodicity;

determining means to determine a fault frequency for each tool and/or subassembly; and generating means to generate a machine stop signal when a maximum permissible fault frequency ($L_1$) or estimated fault probability within a subassembly is not greater than a current mean fault frequency ($\overline{P}$) or fault probability of the tools of the subassembly.

17. Device for diagnosing machines including cigarette-packaging machines for manufacturing products including cigarettes and cigarette packets, comprising:

subassemblies, each subassembly having tools;

fault detection means for investigating whether a product is faulty, and for generating a fault-indicating signal indicating a faulty product;

a control unit to determine and specify a fault-indicating signal periodicity;

assigning means to assign a characteristic periodicity to each subassembly, wherein one of the subassemblies is assigned the fault-indicating signal periodicity;

plotting means to plot a fault curve for each tool and/or subassembly; and generating means to generate a machine stop signal when a maximum permissible fault frequency ($L_1$) or estimated fault probability within a subassembly is not greater than a current mean fault frequency ($\overline{P}$) or fault probability of the tools of the subassembly.

18. Device for diagnosing machines including cigarette-packaging machines for manufacturing products including cigarettes and cigarette packets, comprising:

subassemblies, each subassembly having tools;

fault detection means for investigating whether a product is faulty, and for generating a fault-indicating signal indicating a faulty product;

a control unit to determine and specify a fault-indicating signal periodicity; and assigning means to assign a characteristic periodicity to each subassembly, wherein one of the subassemblies is assigned the fault-indicating signal periodicity;

wherein the number of tools of one of the subassemblies is an integral multiple of the number of tools of another of the subassemblies.

19. Device according to claim 18 further comprising:

a selection device for selecting a subassembly with the aid of the fault-indicating signal periodicity;

a position transmitter assigned to a subassembly for determining the position of a tool within the subassembly;

tool identification means to identify a faulty tool with the aid of the determined position and an offset which specifies a spacing between the fault-detecting means and an examined product; and indicating means for indicating a faulty subassembly and/or a faulty tool.

* * * * *